3,344,809
PRESSURE RESPONSIVE CONTROL SYSTEM
Horace V. Smith, Houston, Tex., assignor to Metrol Corporation, Houston, Tex., a corporation of Texas
Filed Jan. 27, 1965, Ser. No. 428,499
2 Claims. (Cl. 137—624.18)

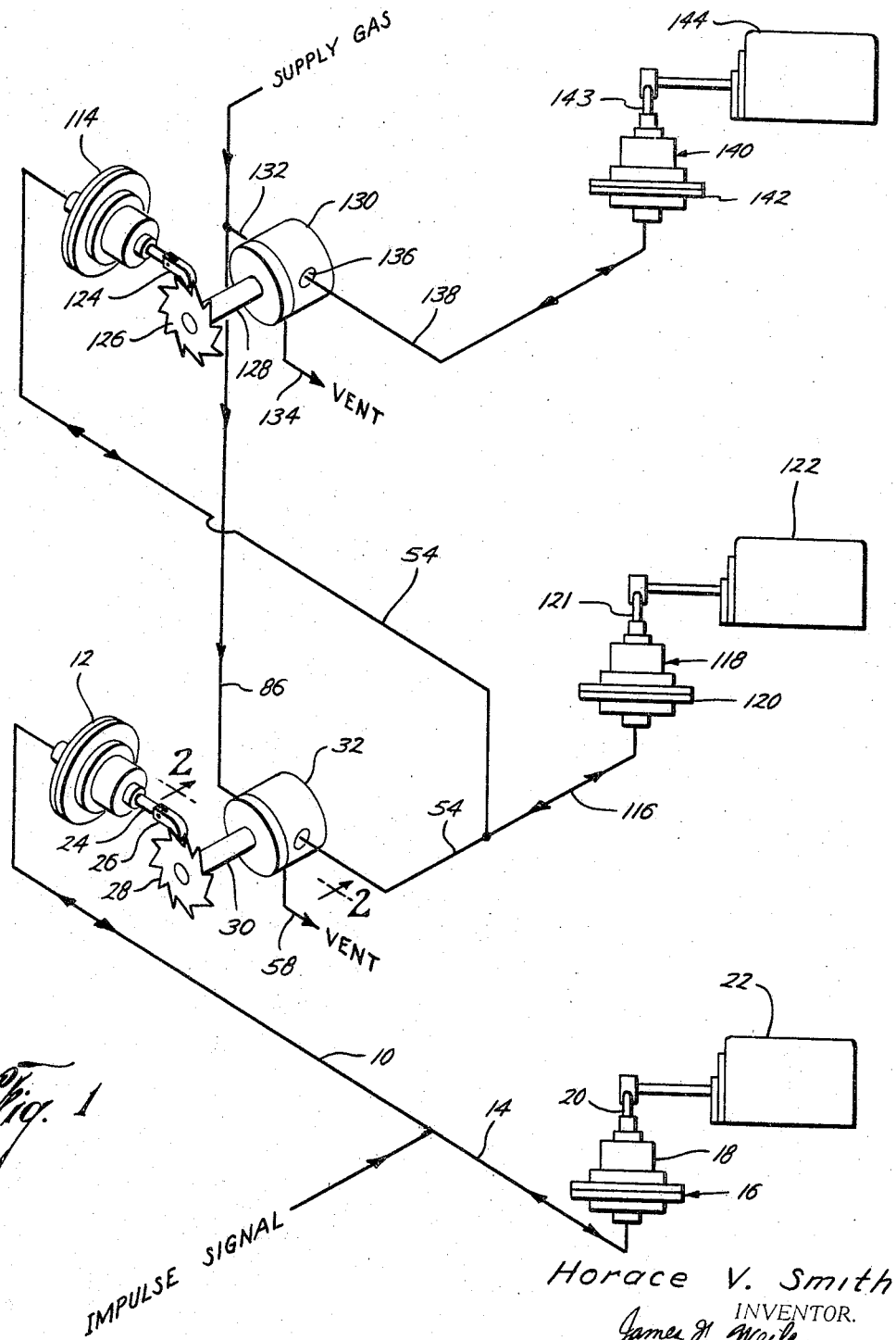

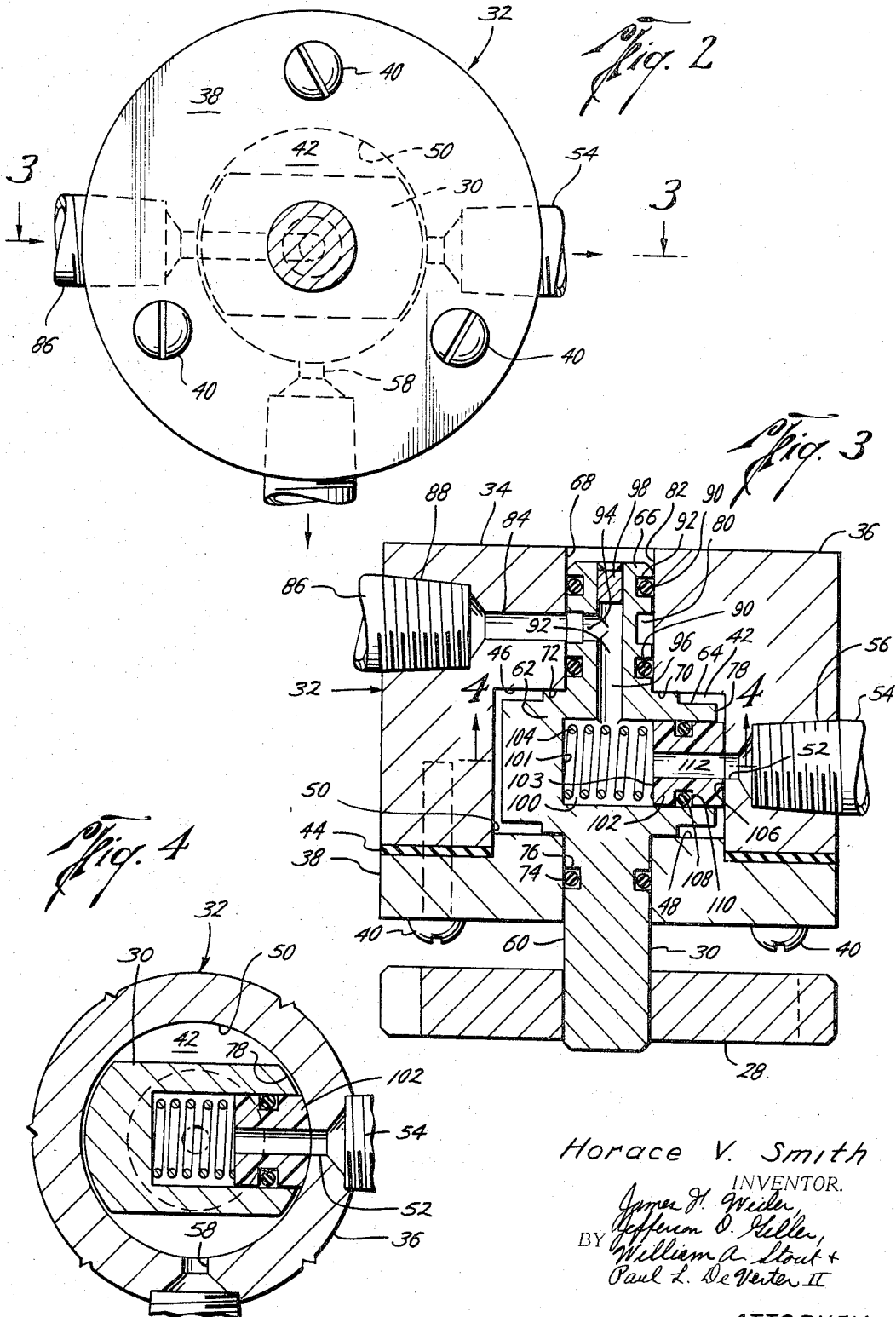

ABSTRACT OF THE DISCLOSURE

This invention relates to a pressure responsive control system for operating pressure responsive devices. More particularly it relates to such a device having at least one pilot valve with a rotor having a fluid passageway through it communicating with a port in the pilot valve in one position of the rotation of the rotor so that fluid pressure supplied to the rotor flows through the rotor and port when the rotor is in this one position. The pilot valve also includes a vent allowing back pressure from the port to drain out the pilot valve when the rotor is not in communication with the port. A pressure responsive actuator is associated with the pilot valve for moving the rotor a portion of its revolution to successive positions each time the pressure responsive actuator receives a pressure impulse. A fluid pressure line communicates from the port of the pressure valve and is connected to a pressure responsive device so that the pressure responsive device is operated each time the rotor is in position communicating the port in the pilot valve. This pressure responsive device may include another pressure responsive actuator and pilot valve.

---

It is a general object of the present invention to provide a pressure responsive control system in which one pressure responsive device receives an actuating pressure impulse after another pressure responsive device receives a predetermined number of actuating impulses.

Another object of the present invention is to provide such a control system which is economical yet dependable in operation.

Still another object of the present invention is to provide such a control system including a pilot valve which permits the passage of fluid pressure through it upon repeats of a predetermined number of pressure impulses and which allows pressure to drain through it at other times.

The system of the present invention can be used to operate pressure responsive devices in many situations such as for blending, distributing, counting, etc. While it is here described in relation to the operation of counters, its use is not limited to such purpose.

Other and further objects, features and advantages will be apparent from the following description of the presently preferred example of the invention, given for the purpose of disclosure and taken in conjunction with the accompanying drawings where like character references designate like parts throughout the several views and where:

FIGURE 1 is a partly diagrammatic perspective view of an example of the control system of the present invention operating counting devices, FIGURE 2 is an end view of a pilot valve of the present invention taken along the line 2—2 of FIGURE 1, FIGURE 3 is a sectional elevation taken along the line 3—3 of FIGURE 2, and FIGURE 4 is a view along the line 4—4 of FIGURE 3.

Referring now to the drawings, and particularly FIGURE 1, a fluid pressure line 10 is operatively connected to a first pressure responsive actuator 12 and is adapted to receive impulse signals, either pneumatic or hydraulic. The line 10 includes a portion 14 which is adapted to be connected to a first pressure responsive device, here illustrated generally by the numeral 16. The first pressure responsive device 16 includes a spring loaded diaphragm counter actuator 18 which is so constructed that pressure in the portion 14 of line 10 acting against the diaphragm, not shown, in the counter actuator 18 moves a rod 20 upwardly while release of pressure in the portion 14 of line 10 allows a spring, not shown, in the counter actuator 18 to retract the diaphragm rod 20. The rod 20 is connected to a mechanical counter 22 and actuates it each time the rod 20 moves upwardly.

The spring loaded diaphragm counter actuator 18 and the mechanical counter 22 are conventional and do not constitute the present invention as they are merely an example of a pressure responsive device. No further description of either of them is necessary.

The first pressure responsive actuator 12 is in all respects identical in construction to the counter actuator 18 except that there is pivotally attached to the end of the rod 24 a pawl 26 which successively engages ten notches on a ratchet wheel 28. Thus, each time an impulse is received in line 10 the ratchet wheel 28 advances one-tenth of a revolution.

Referring now to FIGURES 2 through 4, the ratchet wheel 28 is secured to a rotor 30 of a first pilot valve 32. The pilot valve 32 as a whole includes a casing 34, generally cylindrical in form, in which is rotatably mounted the rotor 30. The casing 34 includes a block 36 of generally U-shaped configuration, when viewed in sectional elevation as illustrated in FIGURE 3, and an end plate 38 secured such as by the screws 40 over the end of the block 36, forming a valve chamber 42 within the casing 34. Preferably a gasket 44 is placed between the block 36 and the end plate 38. The valve chamber 42 is cylindrical in shape and is defined by the opposed inner walls 46 and 48 in the block 36 and at the inner surface of the end plate 38 respectively, and by a lateral interior cylindrical wall 50 in the block 36 between the opposed inner walls 46 and 48.

Provided in the casing 34 through the block 36 and communicating with the valve chamber 42 at the interior cylindrical wall 50 is a port 52 to which is secured a fluid pressure line 54 by means of matching threads 56.

A fluid vent passageway 58 is provided through the casing 34 to the valve chamber 42 at any convenient place where flow through it will not be obstructed. Preferably such port 58 is provided through the block 36.

The rotor 30 is rotatably mounted in the valve chamber 42 with its axis of rotation coinciding with the axis of the cylindrical valve chamber 42. The rotor 30 includes a cylindrical end portion 60 extending through the casing 34 at the end plate 38 and rotatably journaled therein, an enlarged diameter body portion 62 within the valve chamber 42 having a radially extending arm or projection 64 made integral with the body portion 62, and a second end portion 66 of lesser external diameter than the body portion 62 extending through the casing 34 at the cylindrical passageway 68 in the block 36 and rotatably journaled therein.

Adjacent the opposing inner walls 46 and 48 of the valve chamber 42 the body portion 62 has the external shoulders 70 and 72 respectively, to prevent the axial movement of the rotor 30. An O-ring in an annular groove 76 in the end portion 60 of the rotor 30 at the end plate 38 prevents the escape of fluid from the valve chamber 42 along the end portion 60 of the rotor.

The radially projecting arm 64 has an outer end 78 adjacent the cylindrical lateral wall 50 of the valve chamber 42 with the end 78 being of greater cross-sectional dimension than the diameter of the port 52.

Formed in the surface of the end portion 66 of the rotor 30 at a point spaced along the rotor 30 from the arm 64 and within the cylindrical passageway 68 is an annular groove 80 which with the cylindrical wall 82 of the cylindrical passageway 68 in the block 36 forms an annular feed passageway surrounding the rotor 30. Communicating between the exterior of the casing 34 and this annular groove 80 is a fluid pressure passageway 84 whereby a supply of fluid pressure from the exterior of the casing 34 is supplied to the annular feed passageway defined by the annular groove 80 and the wall 82. Means to connect a fluid supply conduit 86 to the fluid pressure passageway 84 is provided by the enlarged internally threaded counter bored portion 88. Escape of fluid pressure from the annular groove 80 along the rotor 30 is prevented by an O-ring 90 in each of two annular grooves 92 in the rotor 30 on each side of the annular groove 80. These O-rings also prevent the escape of fluid from the valve chamber 42 through the block 36.

Communicating between the annular groove 80 and the end 78 of the radial arm 64 is a flow passageway 92 which for ease of construction includes a radial port 94 drilled through the annular groove 80 and a straight axial portion 96 formed by drilling from the exterior end of the end portion 66 of the rotor 30. This straight portion 96 of the flow passageway 92 is closed from the free end of the end portion 66 of the rotor 30 by a plug 98. The radial arm 64 has an internal bore 100 forming a part of the flow passageway 92 and extending to the end 78 of the radial arm 64 with the internal bore 100 being of greater diameter than the port 52 in the casing 34. Slidably mounted in the internal bore 100 is an annular thrust plug 102 constantly urged outwardly by a compression spring 104 bearing against the inner end 101 of the internal bore 100 and the inner end or side 103 of the thrust plug 102. The thrust plug 102 has its outer end 106 complementary to the cylindrical internal lateral wall 50 of the valve chamber 42 thereby providing a close fit between the end 106 of the thrust plug 102 and the cylindrical wall 52. The thrust plug 102 is made of wear resistant material such as Teflon. Escape of fluid pressure between the exterior of the thrust plug 102 and the internal bore 100 of the radial arm 64 is prevented by an O-ring 108 in an annular groove 110 cut in the external surface of the thrust plug 102. An axial passageway 112 allows fluid pressure to pass through the thrust plug 102.

Referring now to FIGURE 1, the fluid pressure line 54 from the first pilot valve 32 is operatively connected to a second pressure responsive actuator 114 and includes a portion 116 adapted to be connected to a second pressure responsive device indicated generally by the numeral 118 which, for purposes of illustration, is a spring loaded diaphragm counter actuator 120 and a mechanical counter 122 in all respects identical to the counter actuator 18 and the counter 22 previously described.

The second pressure responsive actuator 114 is in all respects identical to the first pressure responsive actuator 12 and includes a pawl 124 which successively engages the ten notches on a ratchet wheel 126 secured to a rotor 128 of a second pilot valve 130. Thus, each time an impulse is received in the pressure line 54 the ratchet wheel 126, and hence the rotor 128, advances one-tenth of a revolution.

The second pilot valve 130 is in all respects identical to the first pilot valve 132. It receives a supply of gas pressure from a branch 132 of the supply line 86, has a vent 134, and has a port 136 to which is connected a fluid pressure line 138. The fluid pressure line 138 is adapted to be connected to a third pressure responsive device indicated generally by the numeral 140 which is here illustrated as a spring loaded diaphragm counter actuator 142 operating a mechanical counter 144 in all respects identical to the counter actuator 18 and counter 22 previously described.

In operation, an incoming pressure impulse signal in the portion 14 of line 10 will move upwardly the rod 20 of the counter actuator 18 and actuate the mechanical counter 22 one time. The signal will simultaneously cause the first pressure responsive actuator 12 to advance the rotor 30 of the first pilot valve 32 one-tenth of a revolution. Assuming that at the time this occurs the radially extending arm or projection 64 of the rotor 30 has been aligned with the port 52, the arm 64 will then pass out of alignment with the port 52 and fluid pressure in the line 54 connected to the port 52 will drain through the valve chamber 42 and out the vent passageway 58 permitting retraction of the diaphragm rod 121 of the actuator 20, placing the second counter 122 in position to be actuated again. Simultaneously pressure previously applied to the second diaphragm actuator 114 will drain through the line 54 and the valve 32 and retract the pawl 124 on the ratchet wheel 126 connected to the second pilot valve 130, placing the pawl 124 in position for another stroke. Such withdrawal of the pawl 124 causes no movement of the rotor 128 in the second pilot valve 130.

When the pressure impulse in line 10 is withdrawn the rod 20 of the counter actuator 18 retracts preparing the counter 22 for further operation. Simultaneously this withdrawal of pressure causes the retraction of the pawl 26 to another notch on the ratchet wheel 28. No further movement occurs at this moment.

When another impulse signal is received in the line 10 the counter 22 is actuated and the pawl 26 advances the ratchet wheel 28 another notch. Again, no further action takes place.

Upon receipt of the tenth impulse signal the radially projecting arm 64 on the rotor 30 of the first pilot valve 32 will be aligned with the port 52 and permit fluid pressure from the supply line 86 to flow through the rotor 30 and into the line 54. This pressure in line 54 causes the rod 121 of the actuator 120 to move upwardly operating the second mechanical counter 122. Simultaneously, pressure in the line 54 also causes the pawl 124 to advance the ratchet wheel 126, and hence the rotor 128 one-tenth of a revolution. If at the time the ratchet wheel 126 is moved one-tenth of a revolution the rotor 128 has been in communication with the port 136 it will move out of communication with the port 136 and permit fluid pressure in the line 138 to exhaust through the second pilot valve 130 and out the vent 134. This will permit retraction of the rod 143 and place the counter 144 in position to be actuated.

A pressure impulse will be received in line 54 each time ten impulses are received in line 10, and each time ten impulses are received in line 54 a pressure impulse will be received in line 138. Thus the counter 22 records each impulse, the counter 122 records each tenth impulse, and the counter 144 records every 100th impulse. Obviously, the ratios could be changed by changing the number of notches on the ratchet wheels 28 and 126.

The present invention is well suited to carry out the objects and attain the advantages and ends mentioned as well as others inherent therein. Changes in details and rearrangements of parts will suggest themselves to those skilled in the art and, accordingly, the invention is to be limited only by the spirit thereof and the scope of the appended claims.

What is claimed is:

1. A control system for operating a plurality of pressure responsive devices comprising:
   (a) First and second pilot valves each including a casing containing a cylindrical valve chamber having a cylindrical wall, a port through the cylindrical wall of the casing, a fluid vent passageway through the casing communicating with the cylindrical valve chamber, a rotor in the valve chamber with its axis of rotation coinciding with the axis of the valve chamber, the rotor including a projection extending radially from said rotor circumferentially aligned with the port, and contacting the cylindrical wall of the casing at the port, a fluid pressure passageway through the rotor communicating between the exterior of the pilot valve and the projection and forming an orifice in the projection whereby when fluid pressure is in the fluid pressure passageway and the projection is over the port, fluid pressure may flow through the pilot valve, (b) A first pressure responsive actuator associated with the first pilot valve for moving its rotor a portion of a revolution to successive positions each time the first pressure responsive actuator receives a pressure impulse, including one position in which its orifice covers its port, (c) A second pressure responsive actuator associated with the second pilot valve for moving its rotor a portion of a revolution to successive positions each time the second pressure responsive actuator receives a pressure impulse, including a position in which its orifice covers its port, (d) A fluid pressure line in communication with the port on the first pilot valve and operatively connected to the second pressure responsive actuator and including a portion adapted to be connected to a pressure responsive device, and (e) A fluid pressure line communicating with the port of the second pilot valve and adapted to be connected to a pressure responsive device.

2. The combination of claim 1 including a fluid pressure line operatively connected to the first pressure responsive actuator and having a portion adapted to be connected to a pressure impulse source and a pressure responsive device.

References Cited
UNITED STATES PATENTS

| | | | |
|---|---|---|---|
| 1,842,382 | 1/1932 | Arey | 251—230 X |
| 2,821,998 | 2/1958 | Mayhew | 137—625.11 |
| 3,136,335 | 6/1964 | Beech | 137—624.13 |
| 3,116,757 | 1/1965 | Donguy | 137—625.11 |

ALAN COHAN, *Primary Examiner.*